UNITED STATES PATENT OFFICE.

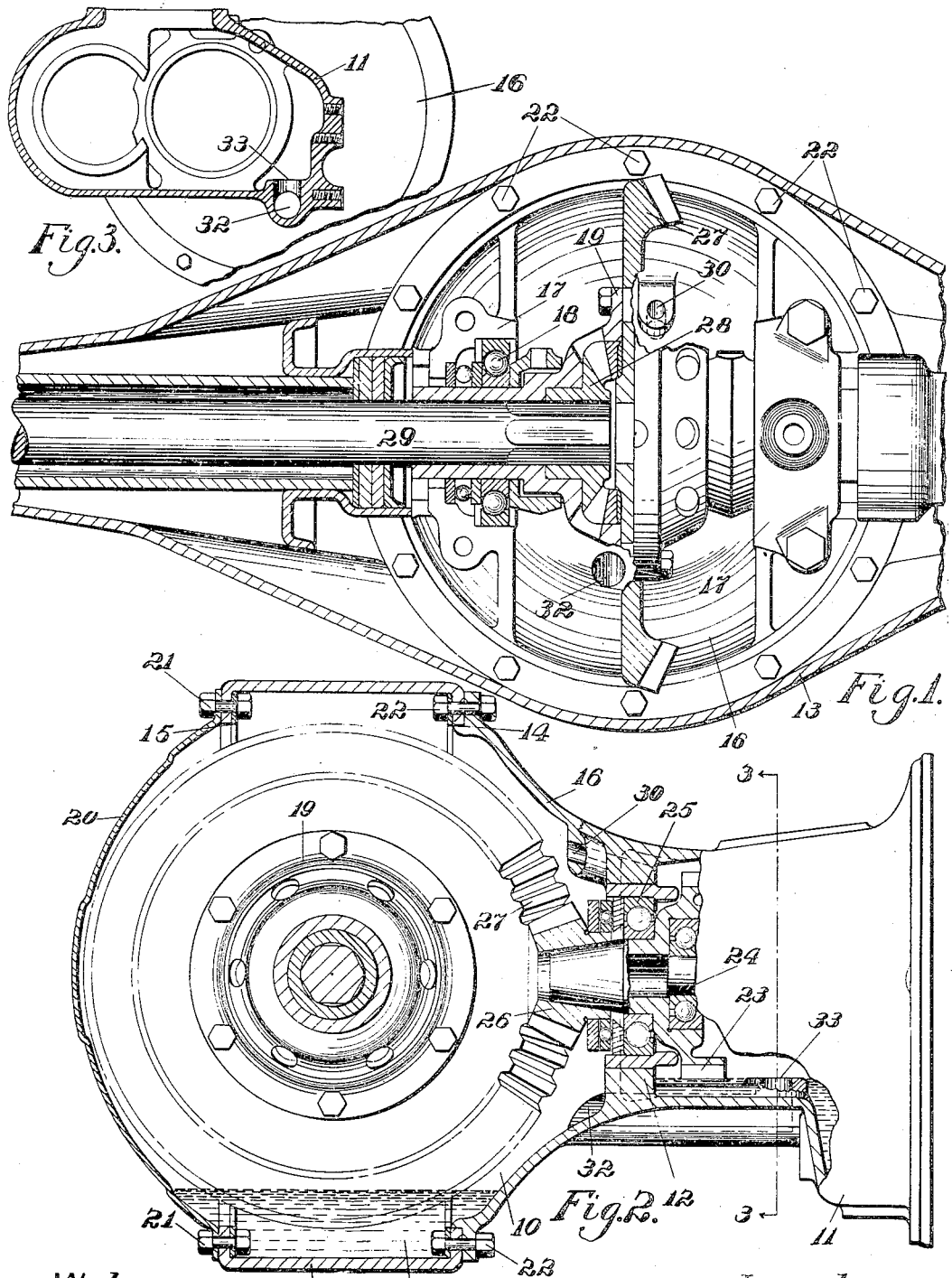
E. C. COOPER.
TRANSMISSION MECHANISM FOR MOTOR VEHICLES.
APPLICATION FILED MAY 22, 1914.
1,246,236.
Patented Nov. 13, 1917.

ERWIN C. COOPER, OF DETROIT, MICHIGAN, ASSIGNOR TO PACKARD MOTOR CAR COMPANY, OF DETROIT, MICHIGAN, A CORPORATION OF MICHIGAN.

TRANSMISSION MECHANISM FOR MOTOR-VEHICLES.

1,246,236.

Specification of Letters Patent.

Patented Nov. 13, 1917.

Application filed May 22, 1914. Serial No. 340,224.

*To all whom it may concern:*

Be it known that I, ERWIN C. COOPER, a citizen of the United States, and resident of Detroit, Wayne county, State of Michigan, have invented certain new and useful Improvements in Transmission Mechanism for Motor-Vehicles, of which the following is a specification.

This invention relates to motor vehicles and particularly to the transmission mechanism of such vehicles.

One of the objects of the present invention is to facilitate the lubrication of a motor vehicle transmission mechanism, and particularly of that type of mechanism in which the change speed gearing is arranged adjacent to or as a part of the driving axle.

This and other objects of the invention will appear from the following description taken in connection with the drawings which form a part of this specification, and in which:—

Figure 1 is a substantially vertical section taken longitudinally through a motor vehicle axle embodying this invention;

Fig. 2 is a vertical section taken transversely through the axle shown in Fig. 1; and Fig. 3 is a section on the line 3—3 of Fig. 2 on a slightly smaller scale.

In the embodiment of the invention shown in the drawings there are two casings indicated at 10 and 11 respectively, which casings are separated by a partition 12. The casing or housing 10 comprises the main axle member 13 which is of substantially tubular form and enlarged at its central part having forward and rear openings 14 and 15, respectively, the forward opening being closed by a member 16 which is formed with integral supporting lugs 17 for the bearings 18 of the differential housing 19, and the rear opening 15 being closed by a cap 20, which is removably secured to the axle member 13 as by bolts 21. The member 16 is also secured to the axle member 13 by similar bolts 22, and the member extends forwardly and comprises the casing 11 above referred to. In the latter casing are arranged suitable change speed gears, one of which is shown at 23 formed on a shaft 24, and this shaft is mounted in suitable bearings 25 arranged in the partition 12 and extending therethrough. A bevel driving pinion 26 is suitably secured on the end of the shaft 24 and meshes with a driven gear 27 mounted upon the support 19 of a differential gearing 28. It will be understood that the differential gearing 28 in the support 19 is suitably connected to axle sections 29, which extend through the tubular parts of the axle member 13 to the traction wheels mounted at the ends of said axle member and not shown in the drawings.

In constructions of this general character as heretofore used the lubrication of the gears in each of the casings has been independent of those in the other, and since one of the casings is frequently lower than the other the oil has been found to leak from the higher casing to the lower through the bearings in which the connecting shaft or shafts are mounted. This has led to an unequal distribution of the oil in the casings. In the present invention provision is made for constantly circulating the oil from the higher casing to the lower and back again. In the embodiment of the invention shown the partition 12 is formed with a channel 30 in the upper part of the partition, and this channel is inclined and opens at one end into the casing 11 and at the other end into the casing 10 at a point radial of the driven gear 27 so that the oil or grease 31 that is picked up by the gear 27 from the bottom of the casing 10 is thrown by centrifugal force radially outward and some of it enters the channel 30 and passes through it into the casing 11. The partition or wall 12 is further provided in its lower part with a second channel 32 which opens at one end into the casing 10 and at the other end into the casing 11 at a point removed from said wall and at a suitable height to insure a proper oil level in said latter casing. The opening of the channel 32 into the casing 11 is indicated at 33 in Fig. 2 and it will be seen that the normal oil level is high enough to insure the dipping of the gears into the oil.

Thus the oil or other lubricant that drains into the bottom of the differential housing or casing 10 will be picked up by the driven gear 27 and some of it carried through the channel 30 into the casing 11 where it falls upon gear 23 and the other gears therein and drains to the bottom of said casing 11. When the oil overflows the opening 33 it passes through the channel 32 and back into the casing 10 where it goes through the same process keeping up the circulation as long as the gears revolve.

Having thus described my invention, what I claim and desire to secure by Letters Patent is:—

1. In a transmission mechanism for motor vehicles the combination of a differential housing, a change speed housing separated therefrom by a partition, and means comprising a gear and passages, the latter being located at the top and bottom of said partition, for the circulation of lubricant from one housing to the other.

2. In a transmission mechanism for motor vehicles, the combination of a differential housing, a change speed housing separated therefrom by a partition, gears in said housings, and means including part of said gears for circulating oil from one housing to the other.

3. In a transmission mechanism for motor vehicles, the combination of an axle casing and attached change speed gear casing, said casings having a partition formed between them, axle sections and differential gearing mounted in the axle casing, a driven gear on said gearing, gears in the gear casing, a shaft extending through said partition and driving said driven gear, said partition having a channel in its upper part opening into the axle casing radially of said driven wheel whereby oil thrown therefrom by centrifugal force will pass through said channel into the gear case, and means permitting the return of said oil to said axle casing.

4. In a transmission mechanism for motor vehicles, the combination of an axle casing and attached change speed gear casing, said casings having a partition formed between them, axle sections and differential gearing mounted in the axle casing, a driven gear on said gearing, gears in the gear casing, a shaft extending through said partition and driving said driven gear, said partition having a channel in its upper part opening into the axle casing radially of said driven gear whereby oil thrown therefrom by centrifugal force will pass through said channel into the gear case, and said partition also having a channel in its lower part opening into the gear case at the desired oil level for permitting the return by gravity of said oil to the axle casing.

5. In a motor vehicle, the combination with the rear axle, a casing therefor, a driven gear mounted therein, a transmission gearing, a casing therefor secured to said axle casing, of means including said driven gear for feeding oil to said gearing casing from said axle casing.

6. In a motor vehicle, the combination with the rear axle casing, a driven gear mounted in said casing, the transmission gearing, a casing for said gearing secured to said axle casing, said casings being normally at different levels, of means including said driven gear for constantly circulating the oil from one of said casings to the other of said casings when said driven gear is in operation.

7. In a motor vehicle, the combination with the driving axle casing, a driven gear mounted therein, a casing having transmission gearing mounted therein and secured to said axle casing, of means comprising a driven gear mounted in said axle casing for pumping oil from said axle casing to said gearing casing.

8. In a transmission mechanism for motor vehicles the combination of a differential housing and a change speed housing separated therefrom by a partition, said partition having an inclined passage in its upper part draining toward one housing and a passage in its lower part at a predetermined oil level.

In testimony whereof I affix my signature in the presence of two witnesses.

ERWIN C. COOPER.

Witnesses:
CLAIR J. COTE,
LE ROI J. WILLIAMS.